United States Patent
Yiu et al.

(10) Patent No.: US 10,219,190 B2
(45) Date of Patent: Feb. 26, 2019

(54) METHODS, SYSTEMS, AND DEVICES FOR NETWORK-PROVIDED AUTONOMOUS HANDOVER

(71) Applicant: Intel IP Corporation, Santa Clara, CA (US)

(72) Inventors: Candy Yiu, Portland, OR (US); Yujian Zhang, Beijing (CN); Mo-han Fong, Sunnyvale, CA (US); Youn Hyoung Heo, Seoul (KR)

(73) Assignee: Intel IP Corporation, Santa Clara, CA (US)

( * ) Notice: Subject to any disclaimer, the term of this patent is extended or adjusted under 35 U.S.C. 154(b) by 41 days.

(21) Appl. No.: 15/126,555

(22) PCT Filed: Jun. 24, 2015

(86) PCT No.: PCT/US2015/037479
§ 371 (c)(1),
(2) Date: Sep. 15, 2016

(87) PCT Pub. No.: WO2016/014203
PCT Pub. Date: Jan. 28, 2016

(65) Prior Publication Data
US 2017/0086106 A1 Mar. 23, 2017

Related U.S. Application Data

(60) Provisional application No. 62/027,170, filed on Jul. 21, 2014.

(51) Int. Cl.
*H04W 36/00* (2009.01)
*H04W 72/14* (2009.01)
*H04W 92/20* (2009.01)

(52) U.S. Cl.
CPC ... *H04W 36/0072* (2013.01); *H04W 36/0061* (2013.01); *H04W 72/14* (2013.01); *H04W 92/20* (2013.01)

(58) Field of Classification Search
None
See application file for complete search history.

(56) References Cited

U.S. PATENT DOCUMENTS

2007/0293224 A1* 12/2007 Wang ............... H04W 36/0055
455/436
2009/0168728 A1* 7/2009 Pani ..................... H04W 8/26
370/332

(Continued)

FOREIGN PATENT DOCUMENTS

EP 2696624 A1 2/2014
JP 2009-253614 10/2009

(Continued)

OTHER PUBLICATIONS

International Search Report and Written Opinion for PCT/US2015/037479 dated Oct. 21, 2015; 13 pages.

(Continued)

*Primary Examiner* — Diane L Lo
(74) *Attorney, Agent, or Firm* — Schwabe, Williamson & Wyatt, P.C.

(57) ABSTRACT

Embodiments of the present disclosure describe methods, systems, and devices for facilitating transfer of user equipment (UE) handover in multi-cell networks. A source evolved node B (eNB) may transmit an autonomous handover grant to a UE along with an indication of a target eNB. The source eNB may also make a handover request to the target eNB and provide a UE context to the target eNB. Upon transmission of a handover command, the UE may perform a random access channel procedure to connect to the target eNB. Because the eNB may have the UE context (Continued)

(or may be able to fetch the context), the handover time may be lessened. Other embodiments may be described and/or claimed.

15 Claims, 9 Drawing Sheets

(56) References Cited

U.S. PATENT DOCUMENTS

| | | | |
|---|---|---|---|
| 2010/0330993 A1 | 12/2010 | Kone | |
| 2011/0268085 A1 | 11/2011 | Barany et al. | |
| 2011/0310852 A1* | 12/2011 | Dimou | H04W 36/08 370/332 |
| 2014/0064249 A1 | 3/2014 | Lee et al. | |
| 2014/0220974 A1* | 8/2014 | Hsu | H04W 36/0088 455/436 |
| 2015/0133121 A1* | 5/2015 | Li | H04W 36/0083 455/436 |
| 2015/0282033 A1* | 10/2015 | Lunden | H04W 36/0055 455/436 |
| 2015/0334609 A1* | 11/2015 | Waldhauser | H04W 36/0061 455/436 |

FOREIGN PATENT DOCUMENTS

| | | |
|---|---|---|
| JP | 2010-147797 | 7/2010 |
| JP | 2012-509619 | 4/2012 |
| JP | 2012-509620 | 4/2012 |
| WO | 2013038052 A1 | 3/2013 |

OTHER PUBLICATIONS

3GPP, "Technical Specification Group Radio Access Network; Evolved Universal Terrestrial Radio Access (E-UTRA); Radio Resource Control (RRC); Protocol specification (Release 12)," 3GPP TS 36.331 V12.2.0 (Jun. 2014), Jul. 4, 2014, Lte Advanced, 365 pages.

Japanese Office Action issued for Patent Application No. JP2016-572633 dated Jan. 30, 2018; 6 pages.

* cited by examiner

METHODS, SYSTEMS, AND DEVICES FOR NETWORK-PROVIDED AUTONOMOUS HANDOVER

CROSS REFERENCE TO RELATED APPLICATIONS

The present application is a national phase entry under 35 U.S.C. § 371 of International Application No. PCT/US2015/037479, filed Jun. 24, 2015, entitled "METHODS, SYSTEMS, AND DEVICES FOR NETWORK-PROVIDED AUTONOMOUS HANDOVER", which claims priority to U.S. Provisional Application No. 62/027,170 entitled "NETWORK CONTROLLED AUTONOMOUS HANDOVER" filed on Jul. 21, 2014, which are hereby incorporated by reference in their entireties.

FIELD

Embodiments of the present disclosure generally relate to the field of wireless communication, and more particularly, to methods, systems, and devices for handover in multi-cell networks.

BACKGROUND

In many scenarios, user equipment ("UE") which is connected to a first $3^{rd}$ Generation Partnership Project ("3GPP") evolved node B ("eNB") may need to be handed over to a second eNB. These may be referred to as source eNB and target eNB, respectively. However, often, the handover may fail because the UE may not receive a handover command ("HO command"). Oftentimes, the UE may attempt to connect to the target cell in the absence of an HO command. However, when in these circumstances a substantial delay is often experienced because the target eNB may not have a context for the UE, and thus may reject the connection request by the UE. In such cases, the UE may be forced to go idle, introducing further delay as security keys will need to be discarded and then generated again as the UE reconnects to the target eNB and a connection can be established.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

BRIEF DESCRIPTION OF THE DRAWINGS

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter.

However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
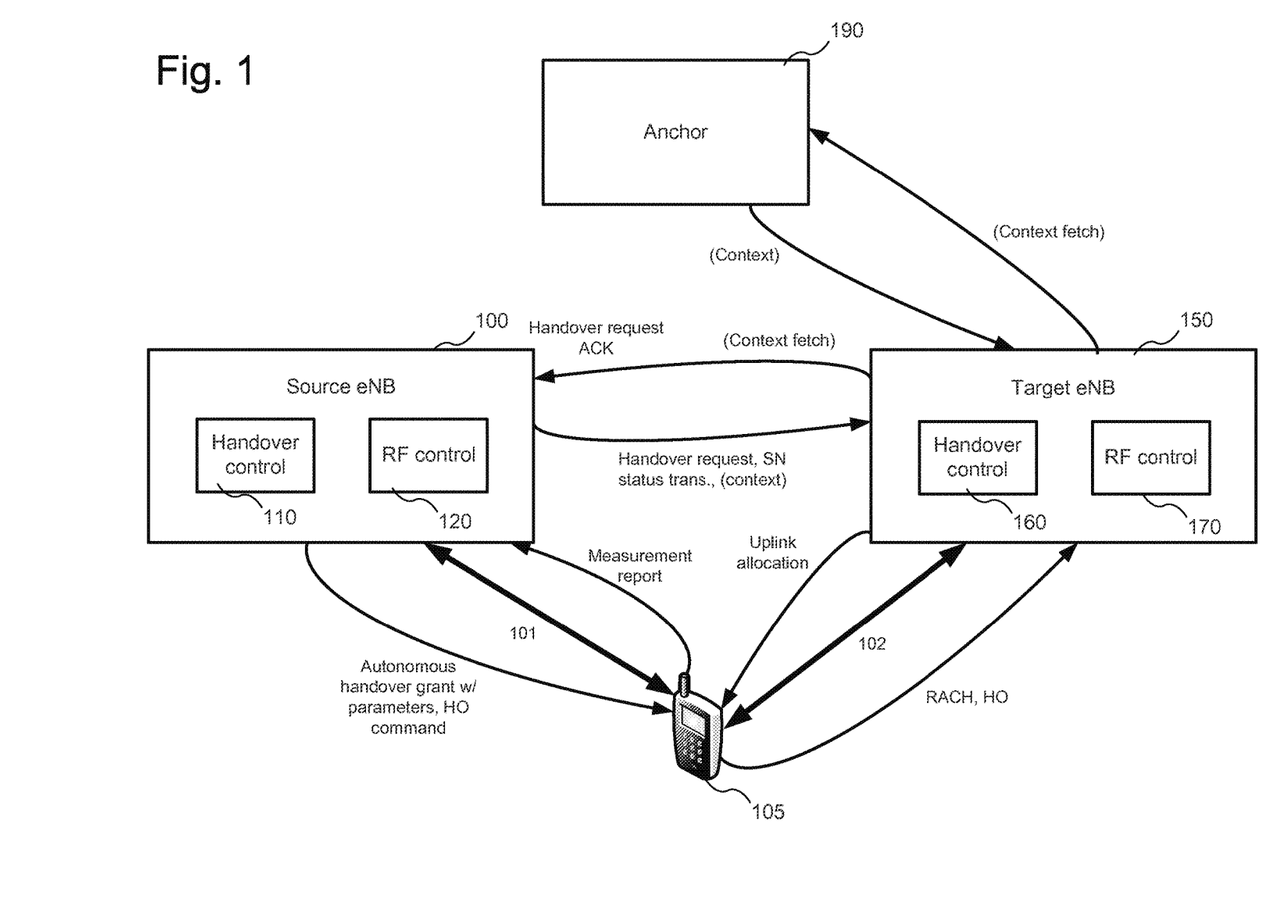
FIG. 1 schematically illustrates a wireless communication environment, in accordance with various embodiments.

FIG. 1 schematically illustrates a wireless communication environment 100 in accordance with various embodiments. The environment 100 may include a UE 105 in wireless communication with one or more eNBs in a 3GPP network, such as, for example, a long-term evolution ("LTE") network or an LTE-Advanced ("LTE-A") network. In particular, FIG. 1 illustrates a source eNB 100 and a target eNB 150, with which the UE 105 may be in wireless communication. In various embodiments, the UE 105 may, at a first time, a have an established wireless connection 101 with source eNB 100. Through use of techniques, apparatuses, and systems described herein, the UE 105 may perform a handover to create a wireless connection 102 with target eNB 150. In various embodiments, the handover may be established through transfer of a context for the UE 105 to the target eNB 150. In various embodiments, context for the UE 105 may include information related to the UE 105 that may facilitate establishment and maintenance of the connection 102 between the UE 105 and the target eNB 150. For example, the UE context may include, but is not limited to, uplink Packet Data Convergence Protocol sequence numbers ("PDCP SN") as well as Hyper Frame Number ("HFN") receiver status and the downlink PDCP SN and HFN transmitter status, an identifier for the UE 105, the EUTRAN Radio Access Bearer ID ("E-RAB ID") for transfer etc.

In various embodiments, the terms "source" and "target", as applied to source eNB 100 and target eNB 150 are not intended to imply particular limitations on the capabilities or qualities of the source eNB 100 and target eNB 150. Instead, the terms are used to differentiate the source eNB 100, with which the UE 105 has an initial wireless connection 101, from the target eNB 150, to which the UE 105 hands over to create the later wireless connection 102.

In various embodiments, the source eNB 100 and target eNB 150, and/or UE 105 may include circuitry to perform various embodiments described herein. In for example, source eNB 100 may include handover control circuitry ("HOCC") 110 which may be configured to perform generation and processing of various communications, including autonomous handover grants, handover commands, measurement reports, handover requests and handover request ACKs, etc. The source eNB 150 may also include radio frequency control circuity ("RFCC") 120, which may be configured to control radio frequency ("RF") circuitry to send and receive communications described herein. Similarly to the source eNB 100, the target eNB 150 may include HOCC 160 which may be configured to generate and process communications relating to handover techniques described herein. The target eNB 150 may also include RFCC 170, which may similarly be configured to send and receive communications described herein. UE 105 may similarly include HOCC and RFCC (not illustrated) to similarly perform handover techniques discussed herein.

In various embodiments, the handover control circuitry 110 of the source eNB 100 may be configured to generate an autonomous handover grant ("AHG") for transmission to the UE 105. The HOCC 110 may generate the AHG in response to a decision to allow a handover of the UE 105 from the wireless connection 101 to the target eNB 150 to create the wireless connection 101. The HOCC 110 may perform this decision based on a measurement report that includes information regarding the wireless connection 101 between the UE 105 and the source eNB 100, as may be understood.

In various embodiments, the AHG may include one or more parameters that correspond to a target cell provided by the target eNB 150. For example, the AHG may include an identification of the target eNB 150. In various embodiments, the AHG may include this identification alone or may include the identification of the target eNB 150 along with indications of other eNBs which may be available for connection by the UE 105. In various embodiments, by providing identification of one or more eNBs, the source eNB 100 may better direct the UE 105 according to network needs, such as to facilitate load balancing or congestion between various eNBs. The HOCC 110 may also be configured to provide a handover command ("HO command") to the UE 105. In various embodiments, this HO command may or may not be received by the UE 105, such as when the wireless connection 101 is failing. In various embodiments, and as described below, the AHG may include a handover command timer value to define a time period after which the UE 105 may proceed with handover without receiving the HO command. In various embodiments, the AHG may also include one or more system information blocks ("SIBs"), which may include system information that may be used by the UE 105 during handover.

In various embodiments, the HOCC 110 may also be configured to generate a handover request to the target eNB 150, in response the HOCC 160 may be configured to generate a handover request ACK that may be returned to the source eNB 100.

The source eNB 100 may also, in various embodiments, optionally provide the context for the UE 105 to the target eNB 150. In other embodiments rather than being provided directly to the target eNB 150, a context fetch request may be generated by the HOCC 160 and send to the source eNB 100 (or to an anchor 190). In various embodiments, the anchor 190 may include a node to store the UE context so that the target eNBs 150 (or other target eNBs) may later fetch the information without requesting from the source eNB 100. When such context fetch requests are received from the target eNB 150, the source eNB 100 or anchor 190 may confirm that a handover decision was previously made to permit handover to the target eNB 150. In various embodiments, the AHG may include a permit to demonstrate that the UE 105 has permission to perform a handover. In such embodiments, the HOCC of the UE 105 may be configured to send the permit to the target eNB 150 during a RACH procedure. The target eNB 150 may then verify the permit before making a context fetch request to the source eNB 100 or the anchor 190. In response to the context fetch request, the source eNB 100 or the anchor 190 may provide the UE context for the UE 105 to the target eNB 150.

In various embodiments, the UE 105 may perform a random access channel procedure ("RACH") to synchronize with the network through the target eNB 150. In various embodiments, the RACH maybe contention based or non-contention based, such as depending on whether the UE 105 received an HO command or not, as may be understood. In response to the RACH, the target eNB 150 may provide an uplink allocation to the UE 105 and the UE 105 may complete a handover to the target eNB 150, establishing the connection 102.

Figure 2:
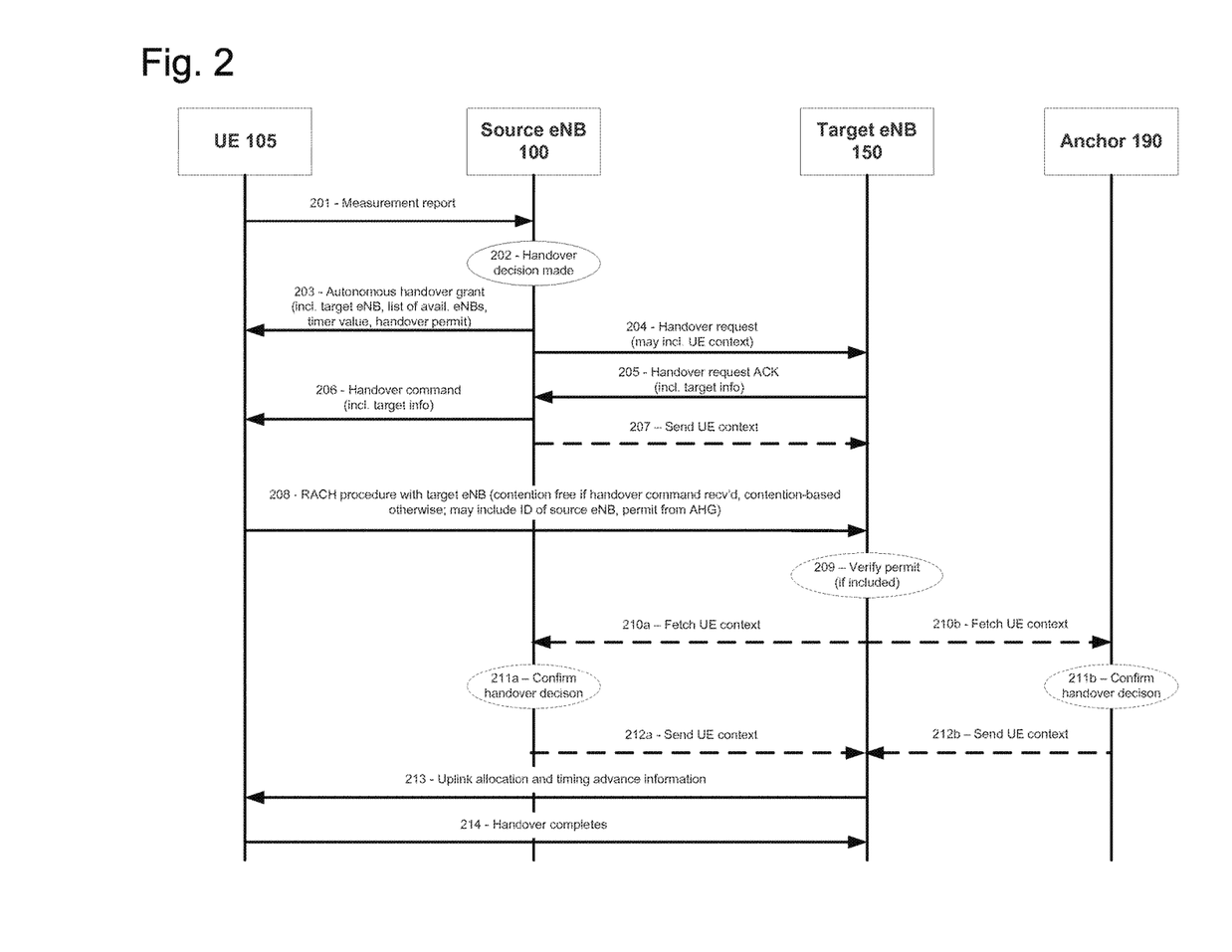
FIG. 2 illustrates a network-provided autonomous handover procedure, in accordance with various embodiments.

FIG. 2 illustrates a network-provided autonomous handover procedure, in accordance with various embodiments. At 201, the UE 105 may send a measurement report to the source eNB 100. The measurement report may be sent by the UE 105 in response to triggering of a measurement event or upon expiration of a reporting timer. At 202, the source eNB 100 may make a handover decision based on the report, such as by the HOCC 100. In the example of FIG. 2, the decision has been made to initiate a handover of the connection of the UE 105, and so the handover procedures continue.

At 203, the source eNB 100, in response to making the handover decision, may send an AHG to the UE 105. In various embodiments, the AHG may include one or more parameters that correspond to a target cell provided by the target eNB to facilitate an autonomous handover of the connection 101. For example, the AHG may include an identification of the target eNB 150 and/or a list of avail. eNBs (which may include the target eNB). The AHG may also include a handover timer value, which may be utilized by the UE 105 to set a timer during which the UE 105 may wait for an HO command. The AHG may also include a permit from the source eNB 100 showing that the UE 105 is permitted to perform a handover. This permit may be used later by the target eNB 150 to determine whether to perform a fetch context request.

At 204, the source eNB 100 may send an HO request to the target eNB 150 and may, in response, receive an HO request ACK at 205, which may include mobility information relating to the target eNB 150 for use by the UE 105. In some embodiments, this HO request may include a UE context for the UE 105; however, as illustrated in FIG. 2, in various embodiments the context may be provided to the target eNB 150 in other ways.

At 206, after receipt of the HO command, the source eNB 100 may send a HO command to the UE 105 over its wireless connection 101. The HO command may include the mobility information received from the target eNB 150 in the HO request ACK. It may be recognized that, in some embodiments, this HO command may not be received over the wireless connection 101, such as if the connection is failing or has failed. Thus, as will be seen below, different procedures may occur based on whether the HO command is received.

After sending the HO command, at 207 the source eNB 100 may optionally send the UE context for the UE 105.

At 208, the UE 105 may begin a RACH procedure with the target eNB. In various embodiments, the RACH procedure may be contention-based or non-contention based depending on whether the HO command was received by the UE 105, as receipt of the HO command may indicate that the source eNB 100 has send an HO request to the target eNB 150 and received an HO request ACK in response. Thus, if the HO command was received by the UE 105, the UE 105 may initiate a non-contention-based RACH at 208. If no HO command was received, the UE 105 may initiate a contention-based RACH at 208. In various embodiments, if the source eNB 100 includes handover timer value in the AHG, the UE 105 may also be configured to set a timer based on the timer value, during which the UE 105 may wait for the HO command. If an HO command is received before completion of the timer, the UE 105 may initiate a non-contention-based RACH. If no command is received in this time, the UE 105 may initiate a contention-based RACH. In various embodiments, the UE 105 may include an identifier of the source eNB 100. In various embodiments, the UE 105 may also include the permit for the handover (received from the source eNB 100 as part of the AHG to the target eNB 150) for use by the target eNB 150 before performing a later context fetch request. Thus, at 209, the target eNB 150 may optionally verify the permit received from the UE 105 before performing a context fetch request. If the permit is verified, the target eNB 150 may perform a context fetch request.

At 210a, or at 210b, the target eNB 150 may optionally send a context fetch request to either the source eNB 100 or to the anchor 190, respectively. In some embodiment, if the UE 105 provides the source eNB 100 information to the target eNB during the RACH procedure at 208, the target eNB may send the context fetch request to the source eNB 100 indicated at 208. In other embodiments anchor nodes may be deployed in the network to improve mobility. In such embodiments, the UE context may be stored in the anchor node 190 and at 209b, the target eNB 150 may send the context fetch request to the anchor node 190. In various embodiments, the target eNB 150 may send this request to the source eNB 100 or the anchor 190 if no context was earlier sent by the source eNB 100. In other embodiments, the UE 105 may not receive the HO command and may select an available eNB from a list of available eNBs provided in the AHG. If the source eNB 100 selects a target eNB that is different than the target eNB to which the source eNB 100 previously sent an HO request (at 204), then the selected target eNB may not have the context for the UE 105, and thus may have to request the UE context.

After receiving a context fetch request, at 211a or 211b, the source eNB 100 or the anchor 190, respectively, may confirm whether the handover decision was made for the UE 105. In various embodiments, the source eNB 100 or the anchor 190 may determine whether the UE 105 was provided an AHG at all, and, if so, whether the AHG included the target eNB 150 as an available eNB. If so, then at 211a or 212b, the source eNB 100 or the anchor 190, respectively, may send the context for the UE 105 to the target eNB 150. In various embodiments, if a permit was verified by the target eNB 150, the source eNB 100 or anchor 190 may not perform a separate confirmation of the handover decision.

At 212, following either the RACH or the fetch of the UE context, the target eNB 150 may provide an uplink allocation and timing advance information to the UE 105 to facilitate the handover. At 213 the handover may be completed.

Figure 3:
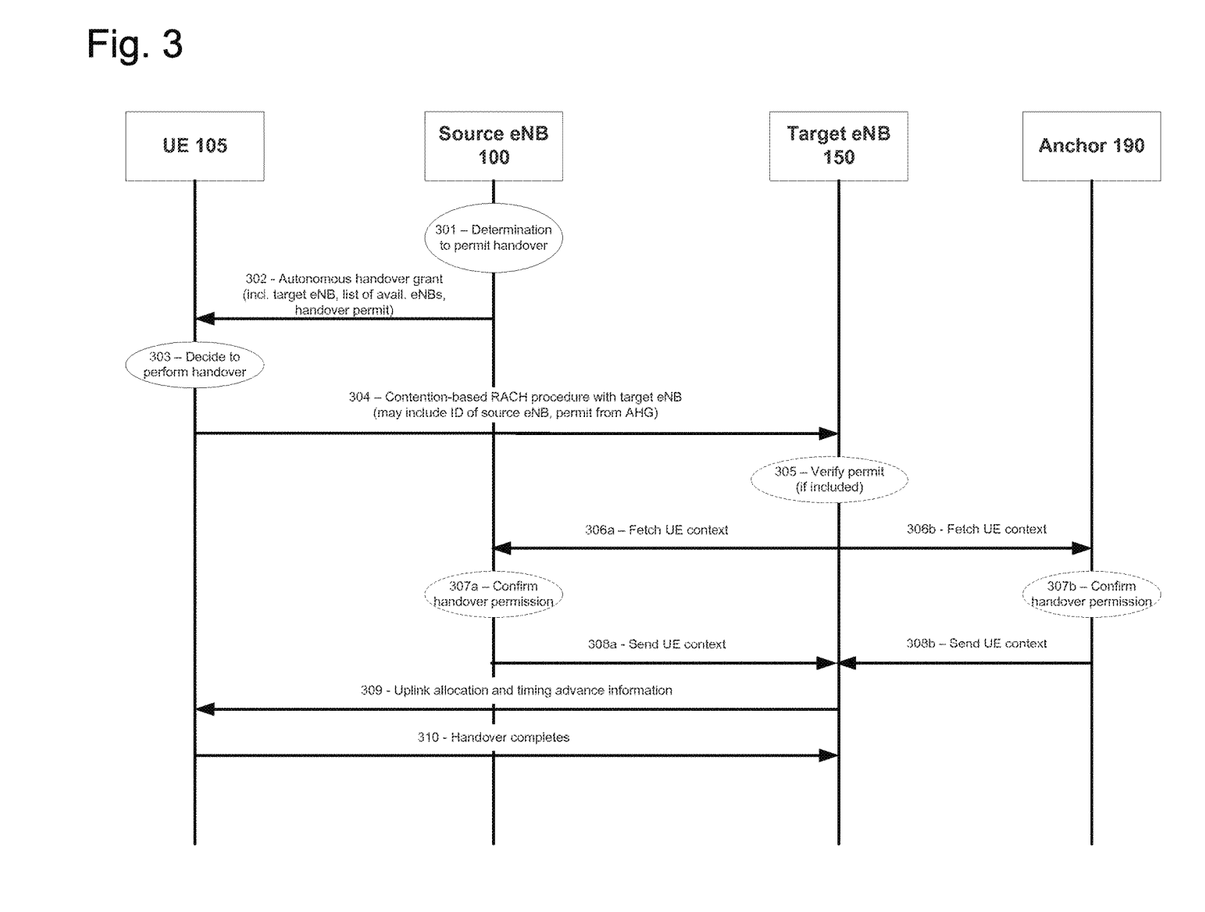
FIG. 3 illustrates a second network-provided autonomous handover procedure, in accordance with various embodiments.

FIG. 3 illustrates a second network-provided autonomous handover procedure, in accordance with various embodiments. In the example procedure of FIG. 3, the AHG may be sent before receipt of a measurement report from the UE 105. The source eNB 100 may thus permit the UE 105 to perform a handover without requiring a measurement report and separate handover decision.

At 301, the source eNB 100 may make a handover permission determination, such as by the HOCC 100. In various embodiments, the source eNB 100 may decide that the UE 105 may perform a handover if the UE 105 determines that a handover should be performed, even in the absence of a separate measurement report by the UE 105 and handover decision by the source eNB 100.

At 302, the source eNB 100, in response to making the handover permission determination, may send an AHG to the UE 105. As discussed above, in various embodiments, the AHG may include one or more parameters that correspond to a target cell provided by the target eNB to facilitate an autonomous handover of the connection 101. For example, the AHG may include an identification of the target eNB 150, a list of avail. eNBs (which may include the target eNB). The AHG may also include a permit from the source eNB 100 showing that the UE 105 is permitted to perform a handover. This permit may be used later by the target eNB 150 to determine whether to perform a fetch context request.

At 303, the UE 105 may decide to perform a handover, such as in response to measurement of a current connection. In response, at 304, the UE 105 may begin a contension-based RACH procedure with the target eNB. In various embodiments, the UE 105 may include an identifier of the source eNB 100. In various embodiments, the UE 105 may also include the permit for the handover (received from the source eNB 100 as part of the AHG to the target eNB 150) for use by the target eNB 150 before performing a later context fetch request. Thus, at 305, the target eNB 150 may optionally verify the permit received from the UE 105 before performing a context fetch request. If the permit is verified, the target eNB 150 may perform a context fetch request.

At 306a, or at 306b, the target eNB 150 may send a context fetch request to either the source eNB 100 or to the anchor 190, respectively. In some embodiment, if the UE 105 provides the source eNB 100 information to the target eNB during the RACH procedure at 304, the target eNB may send the context fetch request to the source eNB 100 indicated at 304. In other embodiments anchor nodes may be deployed in the network to improve mobility. In such embodiments, the UE context may be stored in the anchor node 190 and at 306b, the target eNB 150 may send the context fetch request to the anchor node 190. In various embodiments, the target eNB 150 may send this request to the source eNB 100 or the anchor 190 if no context was earlier sent by the source eNB 100.

After receiving a context fetch request, at 307a or 307b, the source eNB 100 or the anchor 190, respectively, may confirm whether the handover decision was made for the UE 105. In various embodiments, the source eNB 100 or the anchor 190 may determine whether the UE 105 was provided an AHG at all, and, if so, whether the AHG included the target eNB 150 as an available eNB. If so, then at 308a or 308b, the source eNB 100 or the anchor 190, respectively, may send the context for the UE 105 to the target eNB 150. In various embodiments, if a permit was verified by the target eNB 150, the source eNB 100 or anchor 190 may not perform a separate confirmation of the handover decision.

At 309, following the fetch of the UE context, the target eNB 150 may provide an uplink allocation and timing advance information to the UE 105 to facilitate the handover. At 310 the handover may be completed.

Figure 4:
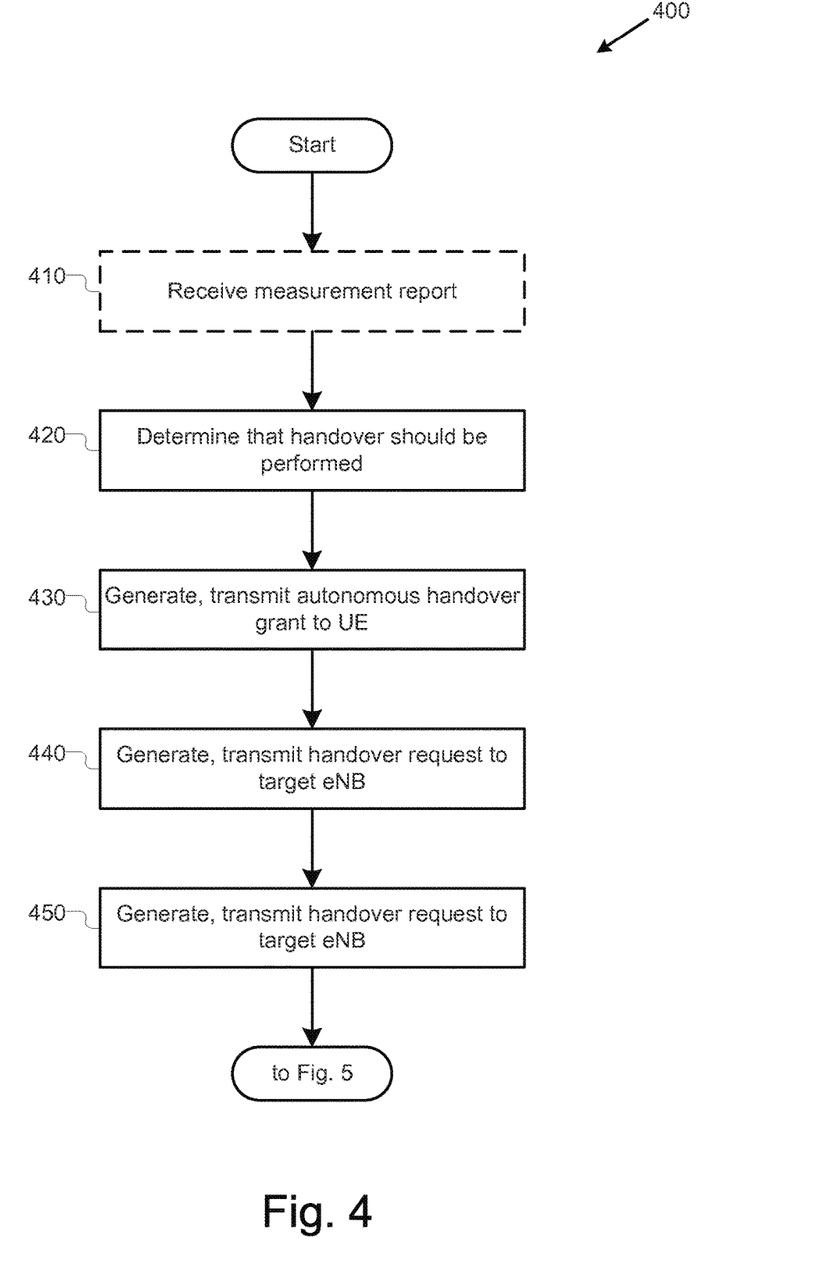
FIG. 4 is a flowchart illustrating a method of operating a source eNB, in accordance with various embodiments.

FIG. 4 is a flowchart illustrating a process 400 of operating a source eNB, in accordance with various embodiments. Process 400 may be performed by a source eNB, for example, source eNB 100, having circuitry designed, programmed, and/or configured to carry out described operations. In particular, the described operations may be carried out by the HOCC 110 and RFCC 120 of the source eNB 100.

The process may begin at operation 410, where the source eNB may optionally receive a measurement report from the UE 105. The measurement report may include information regarding the wireless connection 101 between the UE 105 and the source eNB 100. At operation 420, the source eNB 100 may determine that a handover of the connection should be performed. In various embodiments, at operation 420, the source eNB 100 may determine that handover may be performed in the absence of receiving a measurement report, as discussed above.

At operation 430, the source eNB 100 may generate and transmit an AHG to the UE 105 via the wireless connection 100. In various embodiments, as discussed above, the AHG may indicate a particular target eNB 150 and/or include a list indicating one or more available eNBs to which the UE 150 may establish a new connection. The AHG may also include a handover timer value which may indicate a timer length for the UE 105 to wait for receipt of an HO command. The AHG may also optionally include a permit for the handover which may be verified by the target eNB 150 prior to a context fetch request.

At operation 440, the source eNB may generate and transmit an HO request to the target eNB 150. As discussed above, in various embodiments, this HO request may include the context for the UE 105. At operation $50, the source eNB 100 may receive an HO command ACK form the target eNB 150. This ACK may include mobility information relating to the target eNB 150. In various embodiments, the transmission of the HO request and receipt of the ACK may be done via a wired network connecting the source eNB 100 and target eNB 150 rather than via the RFCC 120. The process may then continue to the process illustrated in FIG. 4.

Figure 5:
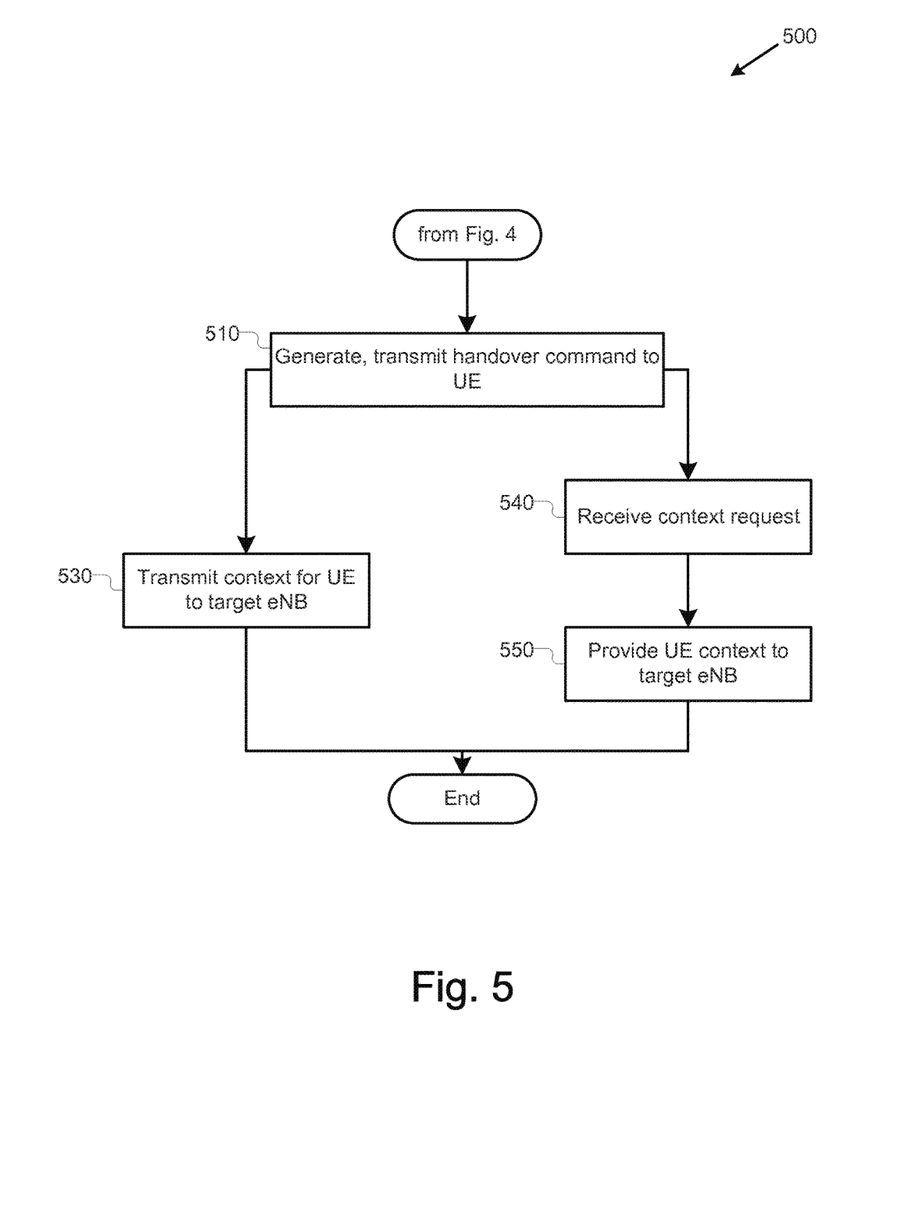
FIG. 5 is a flowchart illustrating a further method of operating a source eNB, in accordance with various embodiments.

FIG. 5 is a flowchart illustrating a further process 500 of operating a source eNB, in accordance with various embodiments. Process 500 may continue from operation 440 of FIG. 1. Process 500 may be performed by a source eNB, for example, source eNB 100, having circuitry designed, programmed, and/or configured to carry out described operations. In particular, the described operations may be carried out by the HOCC 110 and RFCC 120.

The process may continue from operation 440 at operation 510, where the source eNB 100 may generate and transmit an HO command to the UE 105. In various embodiments, the HO command may include mobility information about the target eNB 150. In various embodiments, while the HO command may be transmitted by the source eNB 100, the HO command may or may not be received by the UE 105.

Process 500 may proceed differently depending on whether the source eNB 100 transmits a UE context. Thus, in one option, at operation 530 the source eNB 100 may transmit the UE context for the UE 105 to the target eNB(s), such as if the context was not previously transmitted. In various embodiments, the source eNB 100 may not transmit the context to the target eNB 150, either as part of the HO request or at operation 530. Thus, when no context was sent at operation 530, then at operation 540, the source eNB 100 may receive a context fetch request from the target eNB 100. Then, at operation 550, the source eNB 100 may transmit the context for the UE 105 to the target eNB 150. In various embodiments, the transmission and/or fetching of the context may be done via a wired network connecting the source eNB 100 and target eNB 150 rather than via the RFCC 120. The process may then end.

Figure 6:
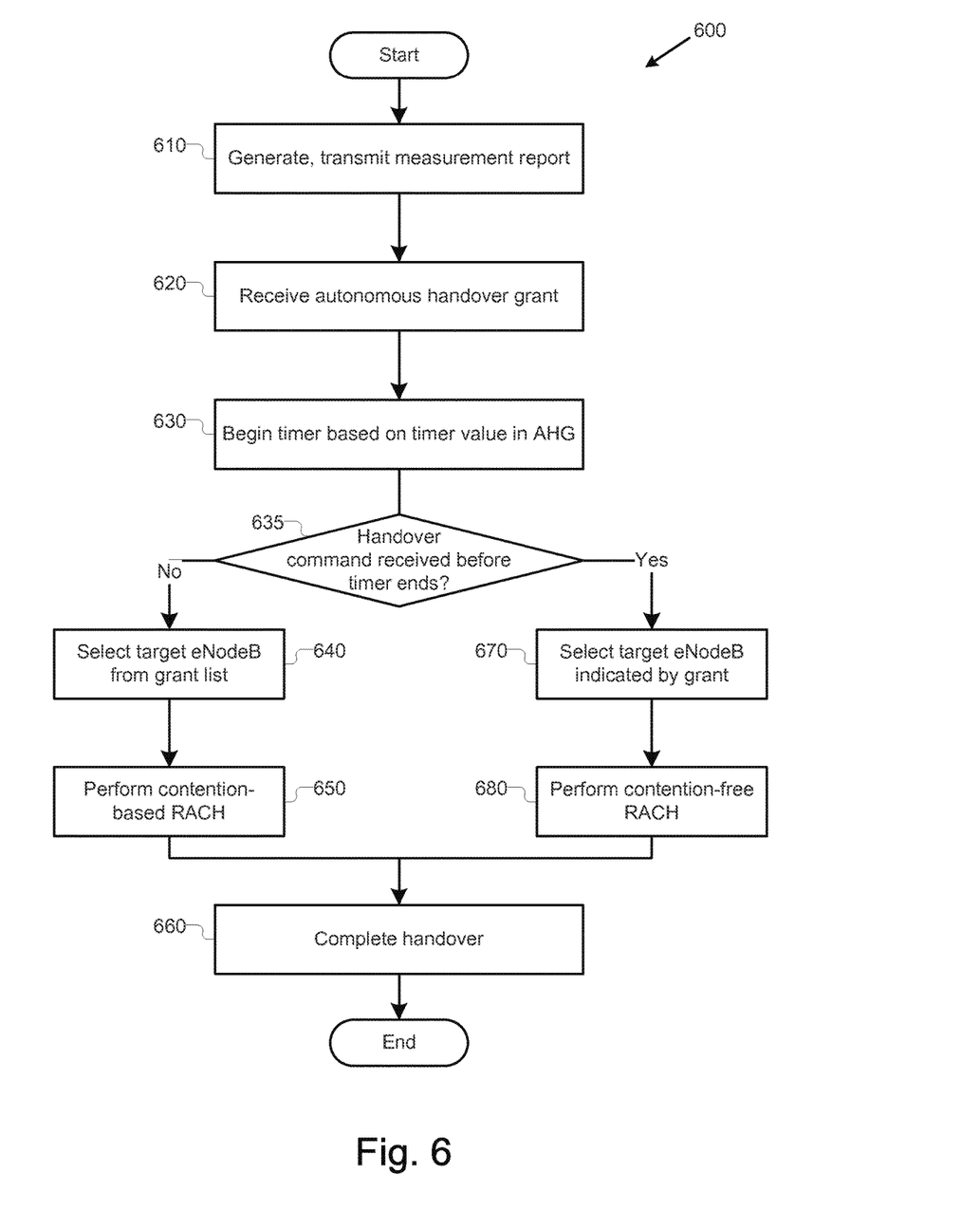
FIG. 6 is a flowchart illustrating a method of operating a UE, in accordance with various embodiments.

FIG. 6 is a flowchart illustrating a process of operating a UE, in accordance with various embodiments. Process 600 may be performed by a UE, for example, UE 105, having circuitry designed, programmed, and/or configured to carry out described operations. In particular, the described operations may be carried out by the HOCC and RFCC of the UE 105. The process may begin at operation 610, where the UE 105 may generate a measurement report and transmit the report to the source eNB 100. As discussed above, in various embodiments, the measurement report may be generated in response to triggering of a reporting event or to the expiration of a reporting timer. The measurement report may include information regarding the wireless connection 101 between the UE 105 and the source eNB 100.

At operation 620, the UE 105, may receive an AHG from the source eNB 100. For example, the AHG may be received in response to a determination that the connection of the UE 105 should be handed over to the target eNB 150. Next, at operation 630, if the AHG includes a handover timer value, the UE 105 may begin a timer based on the handover timer value. In other operations, the AHG may not include a handover timer value. In such embodiments, the UE 105 may utilize a pre-determined timer value for a handover time, or may not utilize a handover timer.

At decision operation 635, the UE 105 may perform different operations depending on whether a HO command was received before the handover timer ends. If no HO command was received before the timer ends, then at operation 640, the UE 105 may select a target eNB 150 from a list of available eNBs included in the AHG. If only one eNB was provided, that eNB may be selected. Next, at operation 650, the UE 105 may perform a contention-based RACH on the selected target eNB 150. Next, at operation 660, the UE 105 may complete the handover and the process may end.

If, however, an HO command is received before the timer ends, or once an HO command is received when no timer is used, then at operation 670, the UE 105 may select the target eNB 150 that was indicated in the AHG. Next, at operation 680, the UE 105 may perform a non-contention-based RACH on the selected target eNB 150. Next, at operation 660, the UE 105 may complete the handover and the process may end.

Figure 7:
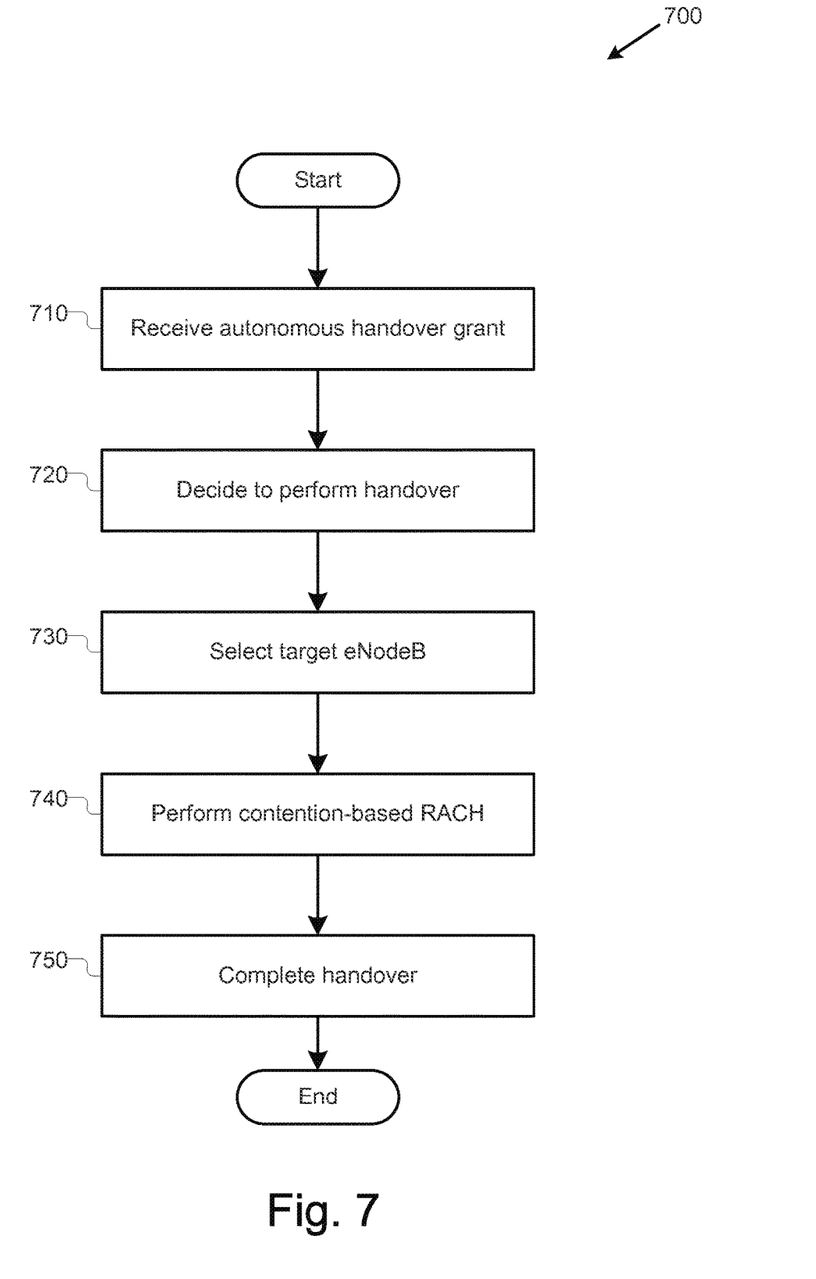
FIG. 7 is a flowchart illustrating a second method of operating a UE, in accordance with various embodiments.

FIG. 7 is a second flowchart illustrating another process of operating a UE, in accordance with various embodiments. Process 700 may be performed by a UE, for example, UE 105, having circuitry designed, programmed, and/or configured to carry out described operations. In particular, the described operations may be carried out by the HOCC and RFCC of the UE 105. In various embodiments, the process of FIG. 7 may be performed when the UE 105 decides to perform a handover in the absence of sending a measurement report to the source eNB 100 and a handover decision by the source eNB 100.

The process may begin at operation 710, where the UE 105 may receive an AHG from the source eNB 100. Next, at operation 720, the UE 105 may decide to perform a handover, such as when the UE 105 is in radio-link failure. ("RLF").

Figure 8:
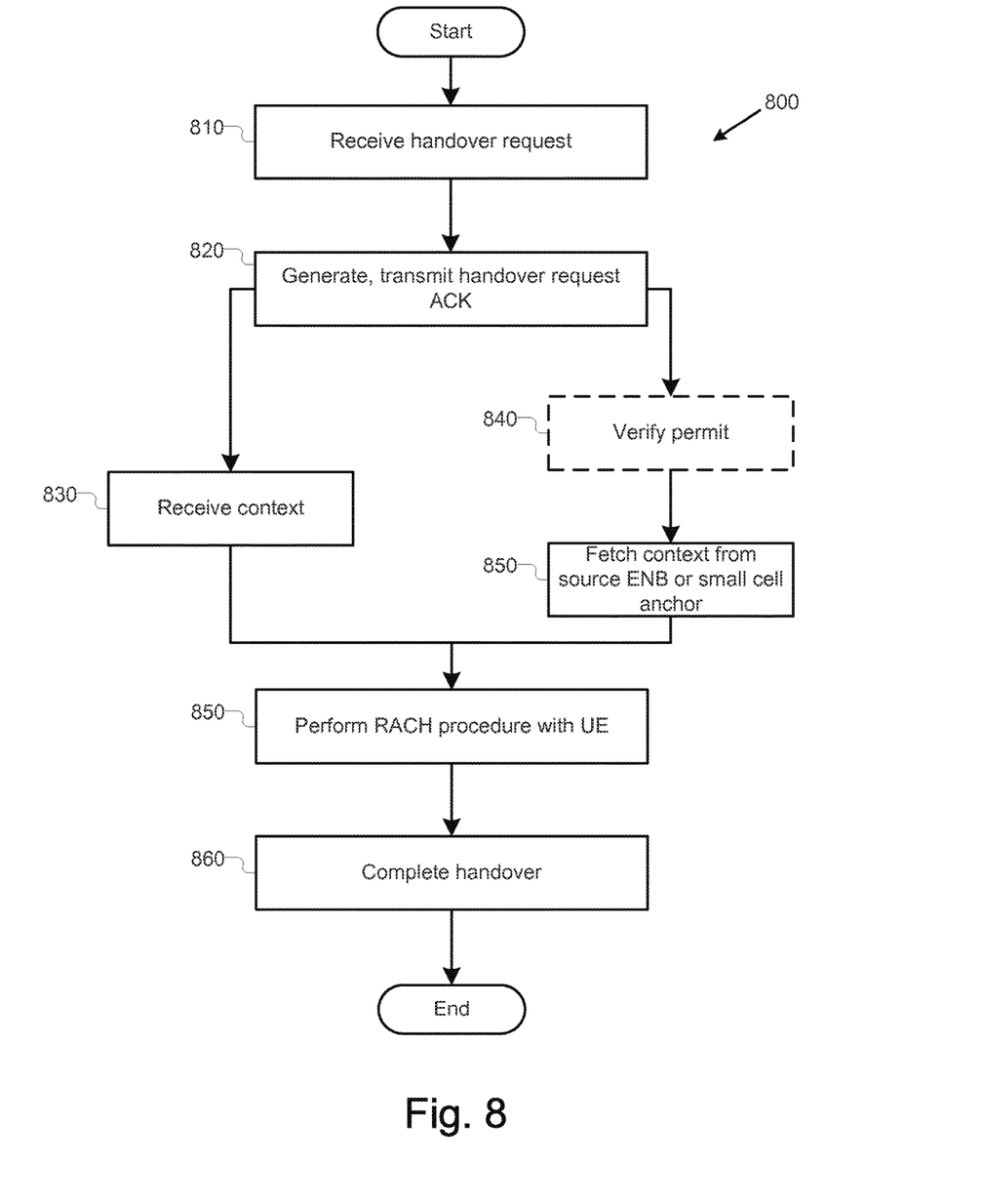
FIG. 8 is a flowchart illustrating a method of operating a target eNB in accordance with various embodiments.

At operation 730, the UE 105 may select a target eNB 150, such as from a target eNB 150 specified in the AHG, and/or from a list of available eNBs included in the AHG. If only one eNB was provided, that eNB may be selected. Next, at operation 740, the UE 105 may perform a contention-based RACH on the selected target eNB 150. Next, at operation 750, the UE 105 may complete the handover and the process may end. FIG. 8 is a flowchart illustrating a process 800 of operating a target eNB in accordance with various embodiments. Process 800 may be performed by a target eNB, for example, target eNB 150, having circuitry designed, programmed, and/or configured to carry out described operations. In particular, the described operations may be carried out by the HOCC 160 and RFCC 170 of the target eNB 150.

The process may begin at operation 810, where the target eNB 150 may receive the HO request from the source eNB 100. In some embodiments, the HO request may include the context for the UE 105. In response, at operation 820, the target eNB 150 may generate a handover request ACK and transmit this to the source eNB 100.

Process 800 may proceed differently depending on whether the source eNB 100 transmits a UE context. Thus, in one option, Thus, at operation 830, the target eNB 150 may receive a UE context from the source eNB 100. If no UE context was sent, however, then at operation 840, the target eNB 150 may optionally verify a permit received from the UE 105. If the target eNB 150 verifies the permit, then at operation 850 the target eNB may fetch the context from the source eNB 100 or from the anchor 190. This fetch may be performed by transmitting a context fetch request to either the source eNB 100 or the anchor 190. In various embodiments, the various communications performed between the source eNB 100 and the target eNB 150 may be done via a wired network connecting the source eNB 100 and target eNB 150 rather than via the RFCC 170. Regardless of how the UE context is obtained, at operation 850, the target eNB 150 may perform the RACH procedure with the UE 105 and complete the handover at operation 860. The process may then end.

Figure 9:
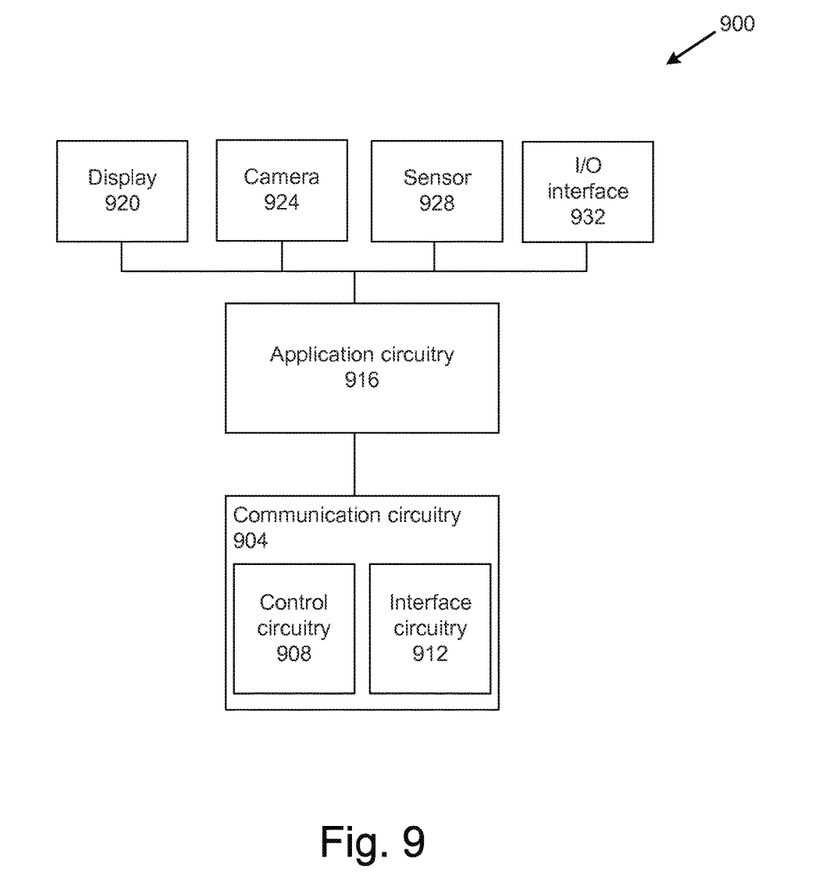
FIG. 9 is a block diagram of an example system that may be used to practice various embodiments described herein.

The components described herein may be implemented into a system using any suitable hardware, firmware, and/or software configured as desired. FIG. 9 illustrates, for one embodiment, an example system 900 comprising communication circuitry 904, which includes control circuitry 908 and interface circuitry 912, application circuitry 916, display 920, camera 924, sensor 928, and input/output (I/O) interface 932, coupled with each other at least as shown.

The application circuitry 908 may include circuitry to enable various applications and/or operating systems running on the system 900.

The control circuitry 908 of the communication circuitry 904 may generate the various messages with the content described herein and may control the interface circuitry 912 to transmit the messages over appropriate communication interfaces. The control circuitry 908 may, in particular, control the handover process operations described herein.

The interface circuitry 912 may include appropriate circuitry to communicate with one or more remote entities by the appropriate communication protocols. For example the interface circuitry 912 may include circuitry designed to communicate using cellular RAN protocols, for example, EUTRAN protocols In some embodiments, the interface circuitry 912 may include circuitry designed to communicate with other components over wired communication links/networks. For example, in an embodiment in which the system 900 embodies an eNB, the interface circuitry 912 may include circuitry designed to communicate using an Ethernet protocol.

In some embodiments, some or all of the constituent components of the communication circuitry 904 may be implemented together on a system on a chip (SOC). In other embodiments, one or more of the constituent components of the communication circuitry 904 may be implemented in discrete hardware. For example, in some embodiments, the interface circuitry 912 may include a cellular radio to communicate using EUTRAN protocols.

In various embodiments, the I/O interface 932 may include one or more user interfaces designed to enable user interaction with the system 900 (especially when the system 900 represents a UE) and/or peripheral component interfaces designed to enable peripheral component interaction with the system 900. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 928 may include one or more sensing devices to determine environmental conditions and/or location information related to the system 900. In some embodiments, the sensors may include, but are not limited to, a gyro sensor, an accelerometer, a proximity sensor, an ambient light sensor, and a positioning unit. The positioning unit may also be part of, or interact with, the communication circuitry 904 to communicate with components of a positioning network, e.g., a global positioning system (GPS) satellite.

In various embodiments, the display 920 may include a display (e.g., a liquid crystal display, a touch screen display, etc.).

In various embodiments, the system 900 may be a UE such as, for example, a laptop computing device, a tablet computing device, a netbook, an ultrabook, a smartphone, etc. In various embodiments, the system 900 may be an eNB. In various embodiments, system 900 may have more or fewer components, and/or different architectures.

The following paragraphs describe examples of various embodiments.

Example 1 may include an apparatus to be implemented in a source evolved node B (eNB). The apparatus may include handover control circuitry. The handover control circuitry may be to determine that a connection of a user equipment (UE) may be permitted to be handed over to a target eNB, generate an autonomous handover grant that may include one or more parameters that correspond to a target cell provided by the target eNB to facilitate an autonomous handover of the connection, and facilitate provision of a context for the UE to the target eNB. The apparatus may also include radio frequency (RF) control circuitry to control RF circuitry to transmit the autonomous handover grant to the UE.

Example 2 may include the apparatus of example 1, wherein the one or parameters may include an identification of the target eNB.

Example 3 may include the apparatus of example 1, wherein the one or more parameters may include system information block (SIB) information for the target eNB.

Example 4 may include the apparatus of example 1, wherein the one or parameters may include a permit for the target eNB to obtain the context for the UE.

Example 5 may include the apparatus of example 1, wherein the one or more parameters may include a handover command timer value to define a time period after which the UE can proceed with the handover without receiving a handover command.

Example 6 may include the apparatus of any of examples 1-5, wherein the handover control circuitry may be to facilitate provision of the context for the UE to the target eNB through transmission of the context to the target eNB.

Example 7 may include the apparatus of example 6, wherein the handover control circuitry may be to cause the context to be transmitted to the target eNB in response to receipt of a request from the target eNB.

Example 8 may include the apparatus of any of examples 1-5, wherein the handover control circuitry may be to facilitate provision of the context for the UE to the target eNB through transmission of the context to an anchor node which may be to transmit the context or the UE to target eNB.

Example 9 may include the apparatus of any of examples 1-5, wherein the handover control circuitry may be further to generate a handover command and the RF control circuitry may be to control the RF circuitry to transmit the handover command to the UE.

Example 10 may include the apparatus of any of examples 1-5, wherein the handover control circuitry may further be to cause a handover request to be transmitted to the target eNB, to process an acknowledgement from the target eNB in response to transmission of the handover request to the target eNB, and to generate the handover command based on the acknowledgement.

Example 11 may include the apparatus of any of examples 1-5, wherein the handover control circuitry may be further to receive a measurement report including information regarding a connection between the UE and the source eNB and to determine that the connection may be to be handed over based at least in part on the information in the measurement report.

Example 12 may include n apparatus to be implemented in a user equipment (UE). The apparatus may include handover control circuity to process an autonomous handover grant transmitted from a source evolved node B (eNB), that may include one or more parameters that correspond to a target cell provided by a target eNB, identify a target eNB which will receive a context for the UE, and connect to the target eNB. The apparatus may also include radio frequency (RF) control circuitry to control RF circuitry to receive the autonomous handover grant from the source eNB.

Example 13 may include the apparatus of example 12, wherein the handover control circuitry may be further configured to generate a measurement report to be transmitted to a source eNB with which the UE has a current connection.

Example 14 may include the apparatus of example 12, wherein the one or more parameters include an identification of the target eNB.

Example 15 may include the apparatus of any of examples 12-14, wherein the RF control circuitry may be further to receive a handover command transmitted from the source eNB and the handover control circuitry may be further to process the handover command transmitted from the source eNB.

Example 16 may include the apparatus of example 15, wherein the handover control circuitry may be further to perform a contention-free random access channel procedure (RACH) in response to the RF control circuitry receiving the handover command.

Example 17 may include the apparatus of example 15, wherein the handover control circuitry may be further to perform a contention-based random access channel procedure (RACH) in response to the RF control circuitry not receiving the handover command.

Example 18 may include the apparatus of any of examples 12-14, wherein the handover circuitry may be further to process a handover timer value included in the autonomous handover grant, handover timer value and the handover circuitry may be further to wait for receipt of a handover command during running of a timer based on the handover timer value.

Example 19 may include the apparatus of example 18, wherein the handover circuitry may be further to, upon completion of the handover timer, and in the absence of receipt of a handover command by the UE, identify the target eNB from amongst one or more available eNBs.

Example 20 may include the apparatus of example 19 wherein the one or more parameters of the autonomous handover grant may include identification of the one or more available eNBs.

Example 21 may include the apparatus of any of examples 12-14, wherein the one or more parameters of the autonomous handover grant may include identification of one or more system information blocks for the target cell.

Example 22 may include an apparatus to be implemented in a target evolved node B (eNB). The apparatus may include handover control circuitry to: process a handover request to hand over a connection from a user equipment (UE) which may be currently connected to a source eNB, process a received context for the UE, and cause connection to the UE. The apparatus may also include radio frequency (RF) control circuitry to control RF circuitry to receive the request to hand over the connection and the context.

Example 23 may include the apparatus of example 22, wherein the handover control circuitry may be further to generate an acknowledgement of the handover request.

Example 24 may include the apparatus of example 22, wherein the handover control circuitry may be further to generate a context fetch request for the context from the source eNB.

Example 25 may include the apparatus of example 22, wherein the handover control circuitry may be further to generate a context fetch request for the context from a small cell anchor.

Example 26 may include the apparatus of example 25, wherein the handover control circuitry may be further to verify a permit for a handover received from the UE prior to generation of the context fetch request.

Example 27 may include the apparatus of any of examples 22-25, wherein the handover control circuitry may be to receive the context from the source eNB in association with the handover request.

Example 28 may include a method for operation in a source evolved node B (eNB). The method may include: determining that a connection of a user equipment (UE) may be permitted to be handed over to a target eNB, generating an autonomous handover grant that may include one or more parameters that correspond to a target cell provided by the target eNB to facilitate an autonomous handover of the connection, transmitting the autonomous handover grant to the UE, and facilitating provision of a context for the UE to the target eNB.

Example 29 may include the method of example 28, wherein the one or parameters may include an identification of the target eNB.

Example 30 may include the method of example 28, wherein the one or more parameters may include system information block (SIB) information for the target eNB.

Example 31 may include the method of example 28, wherein the one or parameters may include a permit for the target eNB to obtain the context for the UE.

Example 32 may include the method of example 28, wherein the one or more parameters may include a handover command timer value to define a time period after which the UE can proceed with the handover without receiving a handover command.

Example 33 may include the method of any of examples 28-32, wherein facilitating provision of the context for the UE to the target eNB may include transmitting the context to the target eNB.

Example 34 may include the method of example 33, wherein transmitting the context to the target eNB may include transmitting the context in response to receipt of a request from the target eNB.

Example 35 may include the method of any of examples 28-32, wherein facilitating provision of the context for the UE to the target eNB may include transmitting the context to an anchor node which may be to transmit the context or the UE to target eNB.

Example 36 may include the method of any of examples 28-32, and may further include generating a handover command and transmitting the handover command to the UE.

Example 37 may include the method of any of examples 28-32, and may further include transmitting a handover request to the target eNB, processing an acknowledgement from the target eNB in response to transmission of the handover request to the target eNB, and generating the handover command based on the acknowledgement.

Example 38 may include the method of any of examples 28-32, and may further include receiving a measurement report including information regarding a connection between the UE and the source eNB and determining that the connection may be to be handed over based at least in part on the information in the measurement report.

Example 39 may include a method for operation in a user equipment (UE). The method may include: receiving an autonomous handover grant from a source evolved node B (eNB), the autonomous handover grant including one or more parameters that correspond to a target cell provided by a target eNB, processing the autonomous handover grant transmitted from the source eNB, identifying a target eNB which will receive a context for the UE, and connecting to the target eNB; and Example 40 may include the method of example 39, and may further include generating a measurement report to be transmitted to a source evolved Node B (eNB) with which the UE has a current connection.

Example 41 may include the method of example 39, wherein the one or more parameters include an identification of the target eNB.

Example 42 may include the method of any of examples 39-41, and may further include receiving a handover command transmitted from the source eNB and processing the handover command transmitted from the source eNB.

Example 43 may include the method of example 42, and may further include performing a contention-free random access channel procedure (RACH) in response to the RF control circuitry receiving the handover command.

Example 44 may include the method of example 42, and may further include performing a contention-based random access channel procedure (RACH) in response to the RF control circuitry not receiving the handover command.

Example 45 may include the method of any of examples 39-41, and may further include processing a handover timer value included in the autonomous handover grant, handover timer value and waiting for receipt of a handover command during running of a timer based on the handover timer value.

Example 46 may include the method of example 45, and may further include, upon completion of the handover timer, and in the absence of receipt of a handover command by the UE, identifying the target eNB from amongst one or more available eNBs.

Example 47 may include the method of example 46, wherein the one or more parameters of the autonomous handover grant may include identification of the one or more available eNBs.

Example 48 may include the method of any of examples 39-41, wherein the one or more parameters of the autonomous handover grant may include identification of one or more system information blocks for the target cell.

Example 49 may include a method to operate in a target evolved node B (eNB). The method may include: receiving a handover request to hand over a connection from a user equipment (UE) which may be currently connected to a source eNB and a context for the UE, processing the handover request, processing the context for the UE, and causing connection to the UE.

Example 50 may include the method of example 49, and may further include generating an acknowledgement of the handover request.

Example 51 may include the method of example 49, and may further include generating a context fetch request for the context from the source eNB.

Example 52 may include the method of example 49, and may further include generating a context fetch request for the context from a small cell anchor.

Example 53 may include the method of example 52, and may further include verifying a permit for a handover received from the UE prior to generation of the context fetch request.

Example 54 may include the method of any of examples 49-52, wherein receiving the context from the source eNB may include receiving the context in association with the handover request.

Example 55 may include one or more computer-readable media containing instructions written thereon that, in response to execution on a source evolved node B (eNB), may cause the computing device or system to perform the method of any of examples 28-38.

Example 56 may include one or more computer-readable media containing instructions written thereon that, in response to execution on a user equipment (UE), may cause the computing device or system to perform the method of any of examples 39-48.

Example 57 may include one or more computer-readable media containing instructions written thereon that, in response to execution on a target evolved node B (eNB), cause the computing device or system to perform the method of any of examples 49-54.

Example 58 may include an apparatus to be implemented in a source evolved node B (eNB), wherein the apparatus may include means for performing the method of any of examples 28-38.

Example 59 may include an apparatus to be implemented in a user equipment (UE), wherein the apparatus may include means for performing the method of any of examples 39-48.

Example 60 may include an apparatus to be implemented in a target evolved node B (eNB), wherein the apparatus may include means for performing the method of any of examples 49-54.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An apparatus to be implemented in a source evolved node B (eNB), the apparatus comprising:
    handover control circuitry to:
        determine, based on a measurement report received from a user equipment (UE), that a connection of the UE is to be handed over to a target eNB;
        generate, based on said determination that the connection is to be handed over, an autonomous handover grant that includes one or more parameters that correspond to a target cell provided by the target eNB to facilitate a handover of the connection;
        facilitate provision of a context for the UE to the target eNB; and
    radio frequency (RF) control circuitry to control RF circuitry to transmit the autonomous handover grant to the UE.

2. The apparatus of claim 1, wherein the one or parameters includes an identification of the target eNB.

3. The apparatus of claim 1, wherein the one or more parameters includes system information block (SIB) information for the target eNB.

4. The apparatus of claim 1, wherein the one or parameters includes a permit for the target eNB to obtain the context for the UE.

5. The apparatus of claim 1, wherein the one or more parameters includes a handover command timer value to define a time period after which the UE can proceed with the handover without receiving a handover command.

6. The apparatus of claim 1, wherein the handover control circuitry is to facilitate provision of the context for the UE to the target eNB through transmission of the context to the target eNB.

7. The apparatus of claim 1, wherein the handover control circuitry is to facilitate provision of the context for the UE to the target eNB through transmission of the context to an anchor node which is to transmit the context for the UE to the target eNB.

8. The apparatus of claim 1, wherein:
    the handover control circuitry is further to generate a handover command; and
    the RF control circuitry is to control the RF circuitry to transmit the handover command to the UE.

9. The apparatus of claim 1, wherein the handover control circuitry is further to:
    cause a handover request to be transmitted to the target eNB; and
    process an acknowledgement from the target eNB in response to transmission of the handover request to the target eNB; and
    generate a handover command based on the acknowledgement.

10. An apparatus to be implemented in a user equipment (UE), comprising:
    handover control circuitry to:
        generate a measurement report based on a connection with a source evolved node B (eNB);
        process an autonomous handover grant transmitted from the source eNB, that includes one or more parameters that correspond to a target cell provided by a target eNB, the one or more parameters to include a handover timer value;
        identify a target eNB which will receive a context for the UE;
        start a timer with the handover timer value;
        if a handover command is received before expiration of the timer, initiate a non-contention-based random access channel (RACH) process; and
        if a handover command is not received before expiration of the timer, initiate a contention-based RACH process; and
    radio frequency (RF) control circuitry to control RF circuitry to transmit the measurement report to the source eNB and receive the autonomous handover grant from the source eNB.

11. The apparatus of claim 10, wherein the one or more parameters include an identification of the target eNB.

12. The apparatus of claim 10, wherein:
    the RF control circuitry is further to receive a handover command transmitted from the source eNB; and
    the handover control circuitry is further to process the handover command transmitted from the source eNB.

13. The apparatus of claim 10, wherein the handover control circuitry is further to, upon completion of the timer, and in the absence of receipt of a handover command by the UE, identify the target eNB from amongst one or more available eNBs.

14. The apparatus of claim 13, wherein the one or more parameters of the autonomous handover grant include identification of the one or more available eNBs.

15. The apparatus of claim 10, wherein the one or more parameters of the autonomous handover grant include identification of one or more system information blocks for the target cell.

* * * * *